United States Patent [19]
Fukuda et al.

[11] Patent Number: 4,926,202
[45] Date of Patent: May 15, 1990

[54] SHUTTER FOR USE IN CAMERA

[75] Inventors: Tsuyoshi Fukuda, Kanagawa; Fumio Shimada, Saitama, both of Japan

[73] Assignee: Canon Kabushiki Kaisha/Canon Denshi Kabushiki Kaisha, Tokyo, Japan

[21] Appl. No.: 217,649

[22] Filed: Jul. 12, 1988

[30] Foreign Application Priority Data

| Jul. 15, 1987 | [JP] | Japan | 62-177607 |
| Jul. 15, 1987 | [JP] | Japan | 62-177608 |
| Jul. 15, 1987 | [JP] | Japan | 62-177609 |
| Jul. 15, 1987 | [JP] | Japan | 62-177610 |

[51] Int. Cl.$^5$ .......................... G03B 9/18; G03B 9/40
[52] U.S. Cl. ..................................... 354/246; 354/249; 354/250
[58] Field of Search ............... 354/246, 247, 248, 249, 354/250, 261, 274, 252

[56] References Cited

U.S. PATENT DOCUMENTS

| 4,009,946 | 3/1977 | Geyer et al. | 354/274 |
| 4,054,892 | 10/1977 | Nakagawa et al. | 354/252 |
| 4,150,890 | 4/1979 | Nakagawa et al. | 354/246 |
| 4,714,336 | 12/1987 | Suzuki et al. | 354/246 |

Primary Examiner—A. A. Mathews
Attorney, Agent, or Firm—Fitzpatrick, Cella, Harper & Scinto

[57] ABSTRACT

A camera shutter has a shutter base plate for pivotally supporting blade groups each constituted by a plurality of blades carried by arms and a thick-walled portion formed on the surface of the shutter base plate that carries the blade groups. The thick-walled portion is formed in an area which excludes a pivoting area in which the arms make their pivotal motions and which is adjacent to the pivoting area. The shutter base plate and the thick-walled portion are integrally formed of a synthetic resin.

21 Claims, 7 Drawing Sheets

SHUTTER FOR USE IN CAMERA

BACKGROUND OF THE INVENTION

1. Field of the Invention

The present invention relates to a shutter for use in a camera.

2. Description of the Related Art

Figure 7:
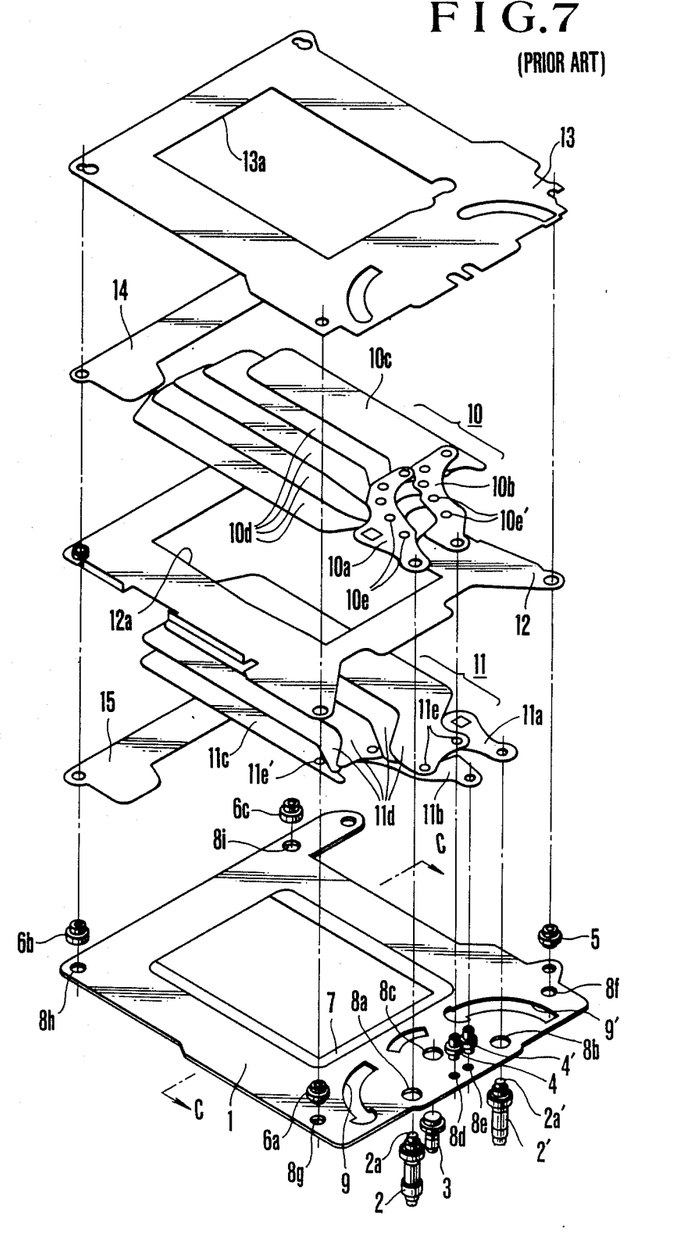
FIG. 7 is a diagrammatic perspective view showing in exploded form a conventional type of camera shutter.

FIG. 7 shows, in exploded form, a conventional type of focal plane shutter for use in a camera.

Referring to FIG. 7, a shutter base plate is represented by numeral 1, and blade driving lever shafts 2 and 2' have main arm bearing shafts 2a and 2a', respectively, each of which is formed at one end of each of the blade driving lever shafts 2 and 2'. A charge lever shaft 3 serves as a pivot axis for rotatably supporting a charge lever (not shown) which causes the blade driving lever shafts 2 and 2' to rotate in the shutter charging direction. Auxiliary arm bearing shafts 4 and 4' are disposed for pivotally supporting corresponding auxiliary arms which will be described later. A cover plate 13 is mounted on the shutter base plate 1 by means of shafts 5, 6a, 6b and 6c. The shutter base plate 1 has an aperture 7, holes 8a to 8i and arcuate slots 9 and 9'. The above-noted shafts 2, 2', 3, 4, 4', 5, 6a, 6b and 6c are respectively fitted into the holes 8a to 8i and fixed to the shutter base plate 1 by caulking. The arcuate slots 9 and 9' are formed so as to correspond to the range of swinging motion of the charge lever (not shown). A leading blade group 10 includes a slit forming blade 10c and separate blades 10d. These blades 10c and 10d are linked by a main arm 10a and an auxiliary arm 10b at caulked portions 10e and 10e', respectively. The main arm 10a is supported for pivotal movement about the main arm bearing shaft 2a of the blade driving lever shaft 2, while the auxiliary arm 10b is supported for pivotal movement about the auxiliary arm bearing shaft 4. A trailing blade group 11 includes a slit forming blade 11c and separate blades 11d. These blades 11c and 11d are linked by a main arm 11a and an auxiliary arm 11b at caulked portions 11e and 11e', respectively. The main arm 11a is supported for pivotal movement about the main arm bearing shaft 2a' of the blade driving lever shaft 2', while the auxiliary arm 11b is supported for pivotal movement about the auxiliary arm bearing shaft 4'. A partition plate 12 is sandwiched between the leading blade group 10 and the trailing blade group 11 so as to prevent the two groups from interfering with each other. The partition plate 12 also has an aperture 12a which corresponds to the aperture 7. The cover plate 13 is formed from a thin metal sheet similarly to the shutter base plate 1 and has an aperture 13a which corresponds to the aperture 7. Spacers 14 and 15 for assuring smooth running of the leading and trailing blade groups 10 and 11 respectively are disposed on the opposite sides of the partition plate 12 and at locations over which the free end portions of the blades 10c, 10d and 11c, 11d slide.

However, such a conventional shutter structure presents the following problem. As described previously, the blade driving lever shafts 2 and 2', the charge lever shaft 3, the auxiliary arm bearing shafts 4 and 4' and the shafts 5, 6a, 6b and 6c are respectively fitted into the hole 8a to 8i in the shutter base plate 1 and fixed thereto by caulking. Therefore, production of such a shutter base plate unit requires a time-consuming and costly working process.

In order to reduce the cost and simplify the production process, such a shutter base plate may be formed of a synthetic resin and, at the same time, the above-described individual shafts may be integrally formed. However, this method involves the following disadvantages. If a large force is applied to such a synthetic resin-molded portion through the blade driving levers, the charge lever or other parts, deformation may occur in the molded portion owing to the force and more or less affect the running of each blade group. It would follow that the accuracy of exposure based on a shutter opening and closing operation (shutter speed) could not be assured. At worst, the shutter base plate might be broken due to lack of physical strength.

The present applicant previously proposed a synthetic resin-molded shutter base plate integral with individual shafts in Japanese Laid-Open Utility Model Application No. Sho 58-16625 (U.S. Patent not applied for). This proposal discloses one embodiment which includes a structure constituted by a combination of a resin molding and intimately superimposed press-cut metal sheets and another embodiment which includes a structure constituted by a combination of a resin molding and an insert-molded metal sheet, both embodiments increasing the physical strength of the shutter base plate. However, this proposal does not disclose any method of solving the previously-described problems with the shutter base plate formed of a synthetic resin alone.

Figure 8:
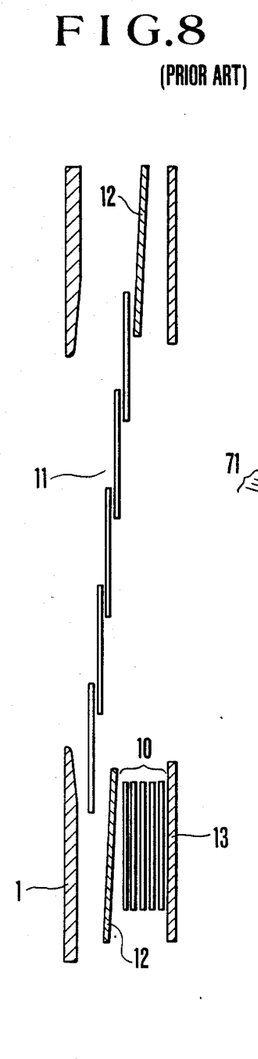
FIG. 8 is a sectional view taken along the line C—C of FIG. 7, and illustrates the shielding of light in the vicinity of a shutter base plate after the vertical running of the trailing blade group of the conventional shutter has been completed.

The conventional shutter structure shown in FIG. 7 further involves the following problem. As shown in FIG. 8 which is a schematic sectional view of a portion including the apertures, gaps may be formed between adjacent blades 11c and 11d when the trailing blade group 11 is in an unfolded state. This could result in a problem such as the deterioration of the light shielding performance of the shutter. To cope with this problem, it has been necessary to adopt a special arrangement which requires a time-consuming production process.

In addition, the shutter base plate 1 shown in FIG. 7 involves the following disadvantages. In order to assure smooth running of the blades, the shutter base plate 1 must be subjected to secondary working such as formation of a chamfer 7a (such as that shown in FIG. 9) on an edge portion which faces the aperture 7. Furthermore, since the shutter base plate 1 is made of a metal material and has the aperture 7 defined by flat end surfaces, harmful light of significant intensity may be reflected by the flat end surfaces. As a result, there is a risk that the film accommodated in the camera may be adversely influenced.

Figure 9:
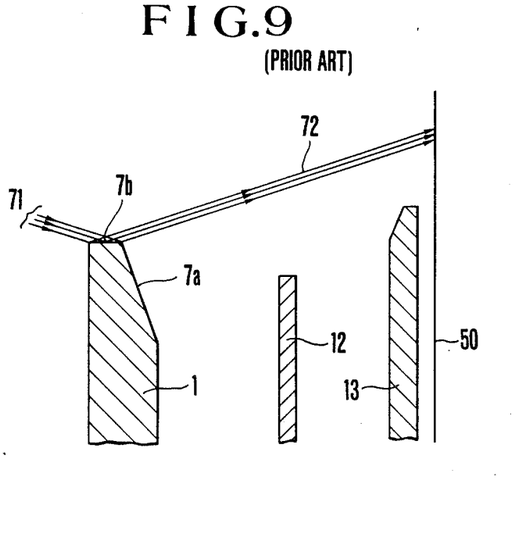
FIG. 9 is a fragmentary enlarged sectional view of the construction of a portion near the apertures in the shutter of FIG. 7 and illustrates the influence of harmful light in the shutter.

Such an adverse influence will be described in detail below with reference to FIG. 9. The camera shutter shown in FIG. 7 is arranged so that the shutter base plate 1 may be mounted on the front plate unit of a camera body (not shown). Therefore, harmful light 71 passing through a photographing lens falls on the shutter base plate 1 and, in turn, is reflected from a flat end surface 7b facing the aperture 7 in the shutter base plate 1 to become reflected light 72 which reaches a film 50 located behind the cover plate 13.

For this reason, the conventional type of shutter structure requires a heavy anti-reflection coating which, even when applied, has been found incapable of completely eliminating the harmful reflected light.

SUMMARY OF THE INVENTION

It is, therefore, an object of the present invention to provide a low-cost camera shutter with a simplified construction.

In accordance with one aspect of the present invention, there is provided a camera shutter including a synthetic resin-made shutter base plate having thick-walled portions for reinforcement purposes, the thick-walled portions being formed integrally with the shutter base plate without the need to increase the overall thickness of the camera shutter.

In accordance with another aspect of the present invention, there is provided a camera shutter including a shutter base plate formed of a liquid crystal polymer and having thick-walled portions for reinforcement purposes, the thick-walled portions being formed integrally with the shutter base plate. Accordingly, in spite of the fact that high flexural rigidity is achieved, a desired portion can be made as thin as a metal sheet and, in addition, flatness can be improved.

The above and other objects, features and advantages of the present invention will become apparent from the following description of a preferred embodiment thereof and its several modified forms, taken in conjunction with the accompanying drawings.

BRIEF DESCRIPTION OF THE DRAWINGS

FIG. 2 (a) is a diagrammatic illustration of the motion of the trailing blade group of the shutter of FIG. 1, and illustrates in dotted line the trailing blade group before its vertical running operation is started;

DETAILED DESCRIPTION OF THE PREFERRED EMBODIMENT

A preferred embodiment of the present invention will be described below with reference to the accompanying drawings.

Figure 1:
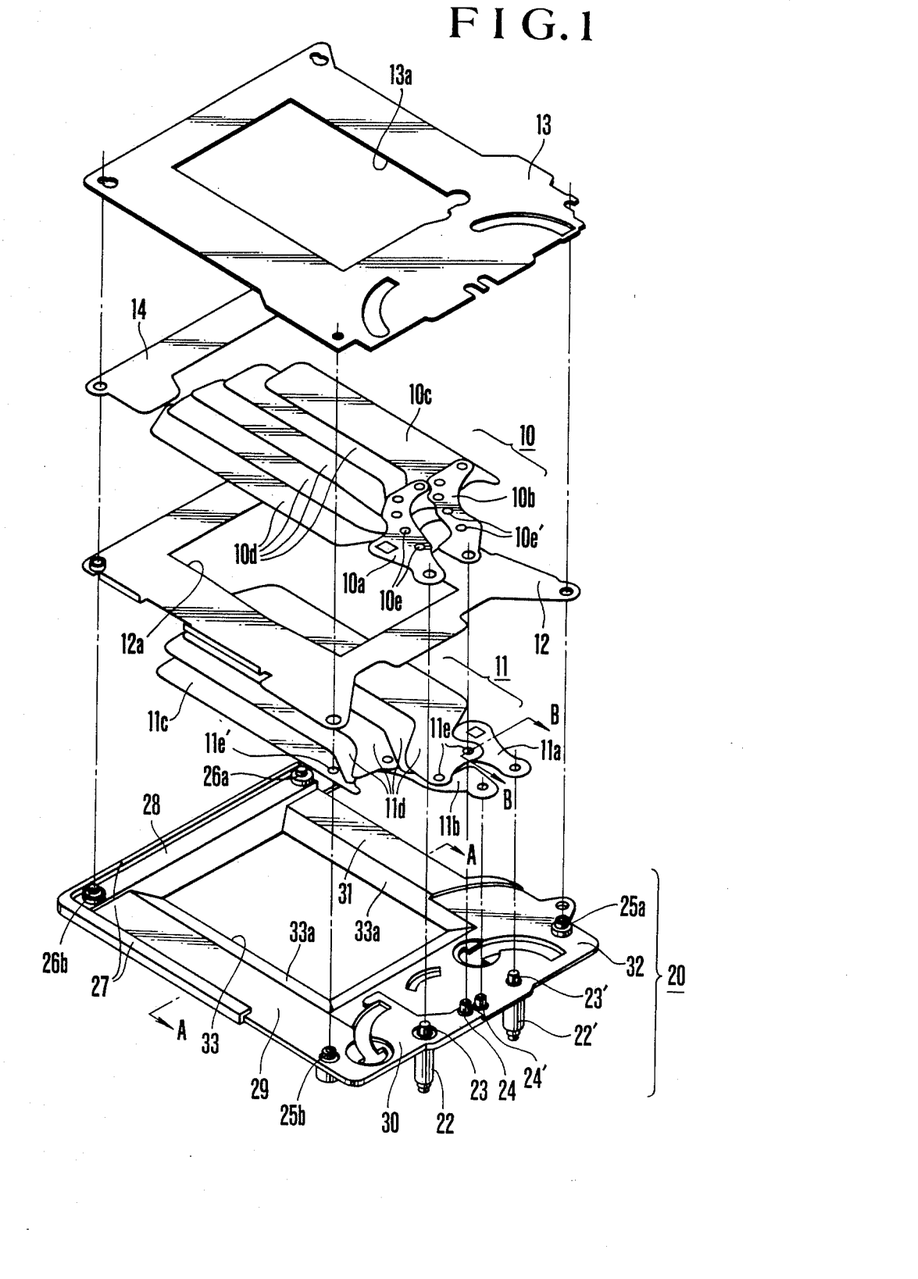
FIG. 1 a diagrammatic perspective view showing in exploded form a camera shutter according to one embodiment of the present invention.

The preferred embodiment of the present invention is shown in FIG. 1 in which like reference numerals are used to denote the like or corresponding components used in the related art example shown in FIG. 7, and descriptions will be omitted for the sake of simplicity.

A shutter base plate 20 is formed of a liquid crystal polymer (LCP) as a synthetic resin material. The shutter base plate 20 is molded integrally with blade driving lever shafts 22 and 22'; a charge lever shaft (which is not shown since it is located under the reverse surface of the shutter base plate 20); main arm bearing shafts 23 and 23'; auxiliary arm bearing shafts 24 and 24'; and shafts 25a, 25b, 26a and 26b by means of which the partition plate 12 for partitioning the running spaces for the leading blade group 10 and the trailing blade group 11, the spacer 14 for assuring smooth running of the leading blade group 10, and the cover plate 13 are mounted on the shutter base plate 20. Since the above-described shafts 22, 22', 23, 23', 24, 24', 25a, 25b, 26a and 26b are molded integrally with the shutter base plate 20, there is no need for the caulking process otherwise necessary for fixing these shafts.

A rib 27 is formed along a portion of the outer periphery of the shutter base plate 20 within a range which does not interfere with the running of the leading and trailing blade groups 10 and 11, and serves to enhance the physical strength of the shutter base plate 20, whereby it is made difficult to bend or break the shutter base plate 20. In place of a spacer (equivalent to the spacer 15 of FIG. 2) which is used in the related art shutter, the area of the shutter base plate 20 that is otherwise occupied by the spacer 15 is formed into a thick-walled portion 28, which is equivalent in function to the spacer 15. Therefore, it is possible to eliminate the spacer 15 (for assuring smooth running of the trailing blade group 11) and to enhance the physical strength of the shutter base plate 20. The portions 29, 30 and 31 other than a running area 32 for both the main arm 11a and the auxiliary arm 11b of the trailing blade group 11 are increased in thickness so that the surfaces of the portions 29, 30 and 31 may protrude from a wall-thickness reference plane which is equivalent to the surface of a running area 32 for the arms 11a and 11b. These thick-walled portions 29, 30 and 31 likewise serve to enhance the physical strength of the shutter base plate 20.

It is to be noted that the rib 27 and the thick-walled portions 28, 29 are formed integrally with the shutter base plate 20 on the side thereof which faces the trailing blade group 11 and at a location remote from the running area 32 for the main and auxiliary arms 11a and 11b, that is, in an area where there is a space defined in the direction of the thickness of the shutter base plate 20, whereby the rib 27 and the thick-walled portions 28, 29 serve to enhance the physical strength of the shutter base plate 20. However, the total thickness of the shutter does not increase.

An aperture 33 is formed in the shutter base plate 20, and chamfers 33a for assuring smooth running of the trailing blade group 11 are formed along the edges which face above and below the aperture 33.

The characteristic of the present embodiment resides in the fact that, in order to enhance the physical strength of the shutter base plate 20, the aforesaid thick-walled portions 29, 30 and 31 are formed at locations where their presence does not lead to an increase in the total thickness of the shutter. In other words, the thick-walled portions 29, 30 and 31 are formed within the space defined on the shutter base plate 20 in the direction of the thickness thereof. Such a characteristic will be described below in detail with reference to FIG. 4.

Figures 3, 4:
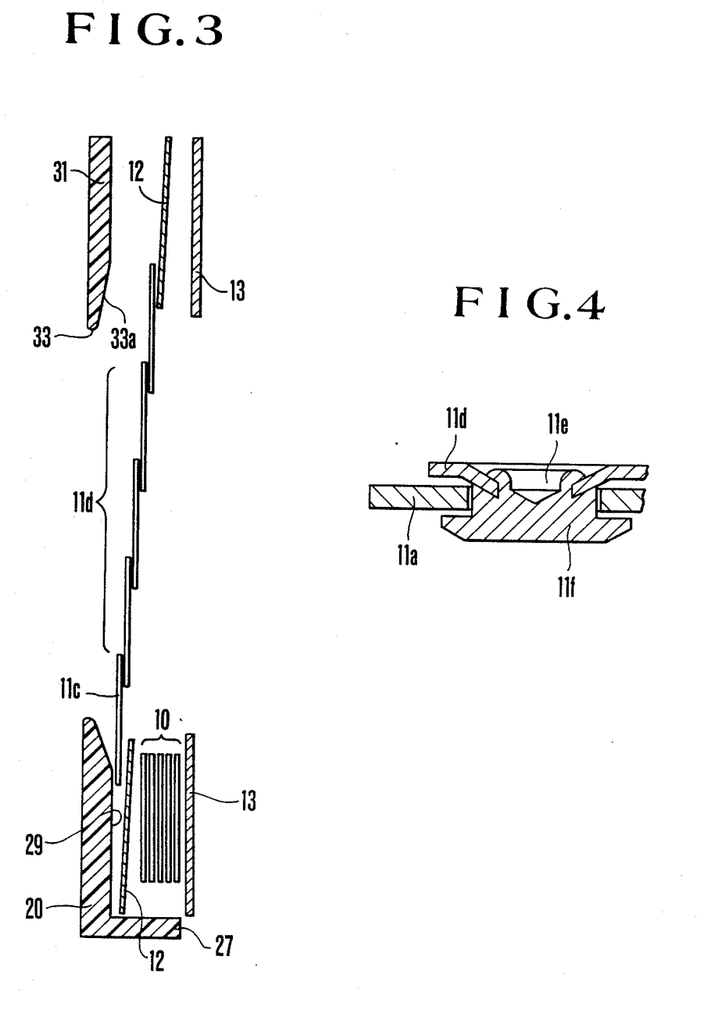
FIG. 3 is a sectional view taken along the line A—A of FIG. 1, and illustrates the shielding of light in the vicinity of the shutter base plate after the vertical running of the trailing blade group of the shutter of FIG. 1 has been completed.
FIG. 4 is a fragmentary enlarged sectional view taken along the line B—B of FIG. 1.

FIG. 4 shows in diagrammatic cross section one of the caulked portions 11e at which the separate blades 11d of the trailing blade group 11 are connected to the main arm 11a in a linked fashion. As clearly shown in FIG. 4, a caulking dowel 11f protrudes from the main arm 11a to the side facing the shutter base plate 20 (to the lower side as viewed in FIG. 4). It is at least necessary that the amount of protrusion of the caulking dowel 11f be determined within a predetermined margin of thickness with respect to the surface of the shutter base plate 20. However, it is common practice to provide a somewhat large margin of thickness which includes a safety factor. The aforesaid thick-walled portions 29, 30 and 31 in the presently preferred embodiment protrude to a height below such a margin of thickness and outside of the running area for both the main arm 11a and the auxiliary arm 11b of the trailing blade group 11 (externally of the running area for the arms 11a, 11b and the caulking dowels 11f). Accordingly, the total thickness of the shutter is not increased.

In the present embodiment, by way of example, the trailing blade group 11 is disposed on the side of the shutter blade plate 20. However, in place of the trailing blade group 11, the leading blade group 10 may of course be disposed on that side.

The states of the trailing blade group 11 in its pre-running and post-running positions will be described next with reference to FIGS. 2(a), 2(b) and 3.

Figure 2A:
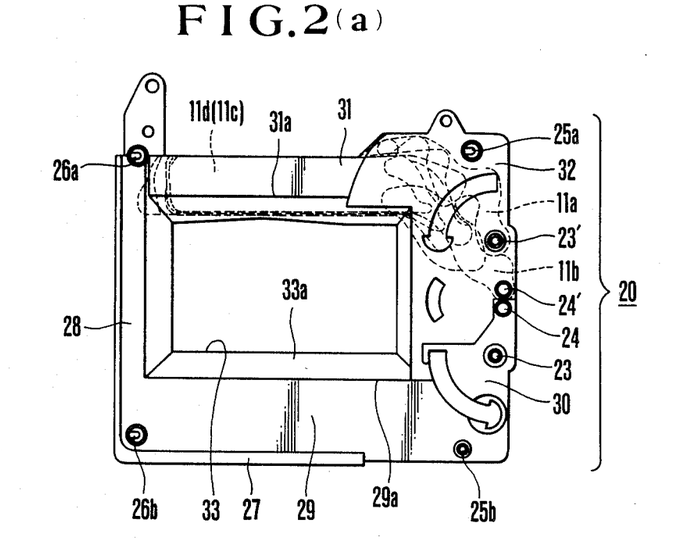
Figure 2B:
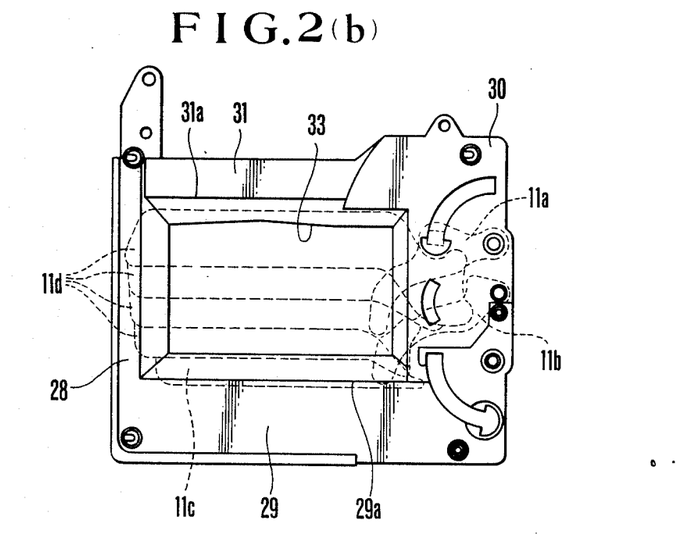
FIG. 2(b) is a view similar to FIG. 2(a), but illustrates in dotted line the trailing blade group after its vertical running operation is completed.

FIG. 2(a) shows the state of the trailing blade group 11 in its pre-running position (the state wherein the aperture 33 is not covered by the trailing blade group 11), with FIG. 2(b) showing the state of the trailing blade group 11 in its post-running position (the state wherein the aperture 33 is covered by the trailing blade group 11). As is evident from these figures, the trailing blade group 11 in its pre-running position is located over the area occupied by both the thick-walled portion 31 and one edge portion 31a which faces the aperture 33 (which portion 31a extends substantially parallel to the longitudinal axis of each blade), at which time the slit forming blade 11c and the four separate blades 11d are completely superimposed upon one another. In its post-running position, the trailing blade group 11 is unfolded so that the whole of the aperture 33 may be covered by the slit forming blade 11c and the four separate blades 11d. However, the slit forming edge of the slit forming blade 11c is located adjacent to the area occupied by both the thick-walled portion 29 and an opposite edge portion 29a of the aperture 33 (which portion 29a extends substantially parallel to the longitudinal axis of the slit forming blade 11c).

As can be seen from FIG. 3 which shows the state of the trailing blade group 11 in its post-running position, the thickness of the thick-walled portion 29 is greater than that of the thick-walled portion 31. Therefore, the blades 11c and 11d are developed (unfolded) with the clearances between adjacent blades 11c and 11d being reduced in thickness (in the lateral direction as viewed in FIG. 3). This greatly improves light shielding performance. This effect can be achieved by making the thickness of the thick-walled portion 29 larger than the thickness of the thick-walled portion 31. If the thick-walled portion 31 has a thickness similar to that of the thick-walled portion 29, the total thickness of the shutter must be increased so as to accommodate the trailing blade group 11 in its pre-running position (FIG. 2(a)) in which the blades 11c and 11d are superimposed upon one another. As described previously, in the trailing blade group 11, the slit forming blade 11c and the separate blades 11d are linked with the main arm 11a and the auxiliary arm 11b by caulking. As clearly shown in fragmentary cross section in FIG. 4, the caulking dowel 11f protrudes from the main arm 11a to the side facing the shutter base plate 20 (to the lower side as viewed in FIG. 4). It is necessary that the amount of protrusion of the caulking dowel 11f be determined within a predetermined margin of thickness with respect to the surface of the shutter base plate 20. However, it is common practice to provide a somewhat large margin of thickness which includes a safety factor. The aforesaid thick-walled portions 29, 30 and 31 in the presently preferred embodiment protrude to a height below such a margin of thickness and outside of the running area 32 for both arms 11a and 11b. Accordingly, the total thickness of the shutter is not at all increased.

In addition, the blades 11c and 11d (five in all) are completely superimposed on the thick-walled portion 31, whereas a single slit forming blade 11c is only located at the thick-walled portion 29. For this reason, in the presently preferred embodiment, the thick-walled portion 29 has an increased thickness so as to enhance the physical strength of the shutter base plate 20. On the other hand, the thick-walled portion 31 also has an increased thickness, but, in order to allow for the total thickness of the trailing blade group 11 when all the blades 11c and 11d are superimposed, the thickness of the thick-walled portion 31 is selected so that the amount of protrusion thereof toward the trailing blade group 11 may be less than that of the thick-walled portion 29. Accordingly, it is possible to accomplish the primary object of improving light shielding performance while providing the antinomical advantages that the physical strength of the shutter base plate 20 is enhanced and that the total thickness of the shutter is not increased.

Figure 5:
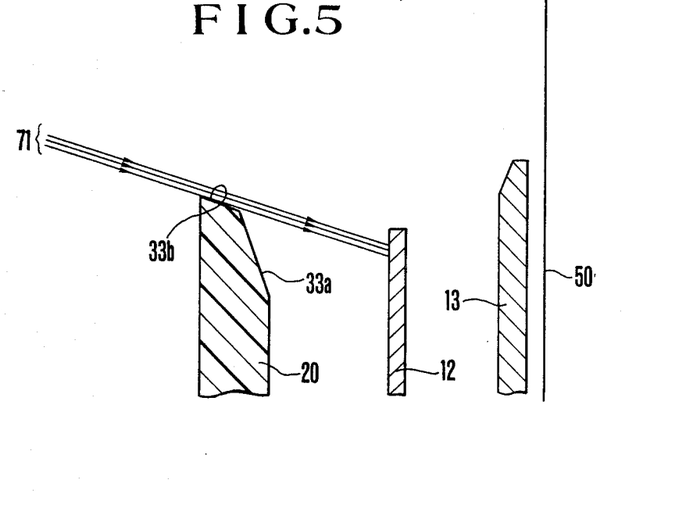
FIG. 5 is a fragmentary enlarged sectional view of one example of the construction of a portion near the apertures in the shutter of FIG. 1, and illustrates the influence of harmful light in the shutter.

As shown in detail in FIG. 5, the aperture 33 has an integrally-molded end surface 33b with an edge-like shape. If the end surface 33b is formed into the edge-like shape shown in this figure, unwanted reflection by the end surface 33b can be substantially eliminated, and the harmful light 71 coming from the direction of the shutter base plate 20 falls upon the surface of the partition plate 12, whereby the adverse influence of the harmful light 71 upon the film 50 can be substantially eliminated. Accordingly, in this modification, since an anti-reflection coating otherwise necessary for the end surfaces of the shutter base plate which face the aperture is not needed in practice, it is possible to achieve a great reduction in the number of manufacturing steps as well as a reduction in cost.

The edge-like shape of the end surface 33b can be molded integrally with the shutter base plate 20 in an identical molding process with a synthetic resin. Therefore, there is no risk that the formation of the edge-like shape may lead to an increase in cost.

Figure 6:
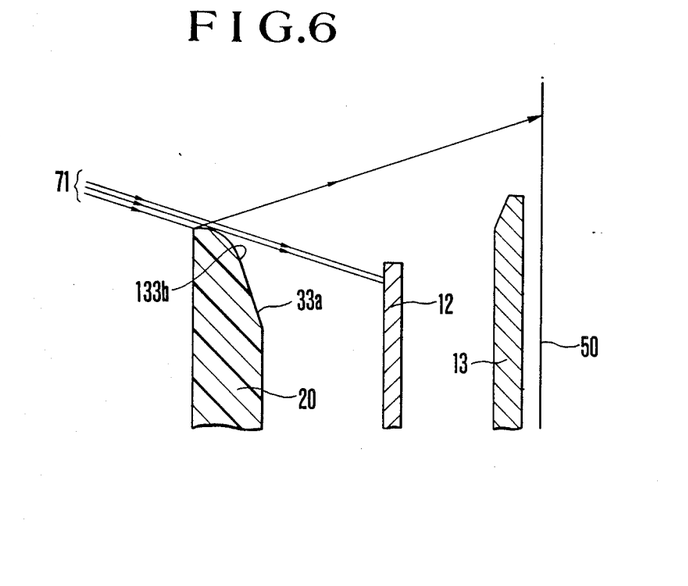
FIG. 6 is a fragmentary enlarged sectional view of another example of the construction of the portion near the apertures in the shutter of FIG. 1.

Another modified form of the shape of the end surface of the aperture 33 will be described below with reference to FIG. 6. In this modified form, the aperture 33 has an integrally-molded end surface 133b with an arcuate shape as shown in detail in FIG. 6. If the end surface 133b is formed into the arcuate shape shown in this figure, unwanted reflection by the end surface 133b can be substantially eliminated, and the harmful light 71 coming from the direction of the shutter base plate 20 falls upon the surface of the partition plate 12, whereby the adverse influence of the harmful light 71 upon the film 50 can be substantially eliminated. Accordingly, in the modification shown in FIG. 6 as well, since an antireflection coating otherwise necessary for the end surfaces of the shutter base plate which face the aperture is not needed in practical terms, it is possible to achieve a great reduction in the number of manufacturing steps as well as a reduction in cost.

The arcuate shape of the end surface 133b can be molded integrally with the shutter base plate 20 in an identical molding process with a synthetic resin. Therefore, there is no risk that the formation of the arcuate shape may lead to an increase in cost.

The above description of each of the modifications is made with reference to a case wherein a photographing lens is located ahead of the shutter base plate 20 and the film 50 is located behind the cover plate 13. However, even in an opposite case where harmful light comes from the direction of the cover plate 13, it is still effective to form the end surface 33b or 133b of the shutter base plate 20 into an edge-like or arcuate shape.

As described above, in accordance with the presently preferred embodiment, it is possible to provide a camera shutter including a synthetic resin-molded shutter base plate which enables the simplification of the manufacturing process and a reduction in cost, the enhancement of the physical strength of such a shutter base plate being accomplished without the need to increase the total thickness of the shutter by forming thick-walled portions on the shutter base plate in the area other than the running area for the arms of the blade group which is adapted to run on the surface of the shutter base plate.

In addition, in accordance with the presently preferred embodiment it is possible to provide a low-cost camera shutter which has an increased physical strength and improved light shielding performance by virtue of the shutter base plate which is integrally molded such that one edge portion which faces the aperture and which corresponds to a position which is occupied, during shielding of light, by the slit forming blade of the blade group adapted to run on the surface of the shutter base plate is thicker than an opposite end portion corresponding to a position which is occupied by the blade group when the blades are superimposed to open the aperture.

Furthermore, in accordance with the presently preferred embodiment, it is possible to provide a low-cost camera shutter in which the adverse influence of harmful light can be eliminated since the edge portion of the synthetic resin-molded shutter base plate that faces the aperture is integrally formed into an edge-like shape.

Furthermore, in accordance with the presently preferred embodiment, it is possible to provide a low-cost camera shutter in which the adverse influence of harmful light can be eliminated since the edge portion of the synthetic resin-molded shutter base plate that faces the aperture is integrally formed into an arcuate shape.

Furthermore, in accordance with the presently preferred embodiment, since the shutter base plate is integrally formed of a liquid crystal polymer resin, it is possible to form the shutter base plate of such a synthetic resin alone without the need for a reinforcement metal plate which has been required in a related art shutter structure, whereby a reduction in cost is achieved.

Use of such a liquid crystal polymer whose polymer molecules are oriented enables molding of products having high bending stiffness and good flatness and, in addition, the formability of the liquid crystal polymer is high. Accordingly, the blade driving lever shaft or the like which is exposed to strong forces is not easily inclined or deformed and the flatness of the aperture plane is maintained. Furthermore, since the liquid crystal polymer resin can easily penetrate into very small gaps in its molten state, it is possible to form a very thin region (for example, 0.8 mm thick) such as the edge portions of the base plate which define the aperture. Incidentally, the present inventors tried integral molding of a shutter base plate with each of a glass fiber-containing polycarbonate resin and a polyether imide (PEI) resin, but no result which could satisfy the object of the invention was obtained.

Figure 10:
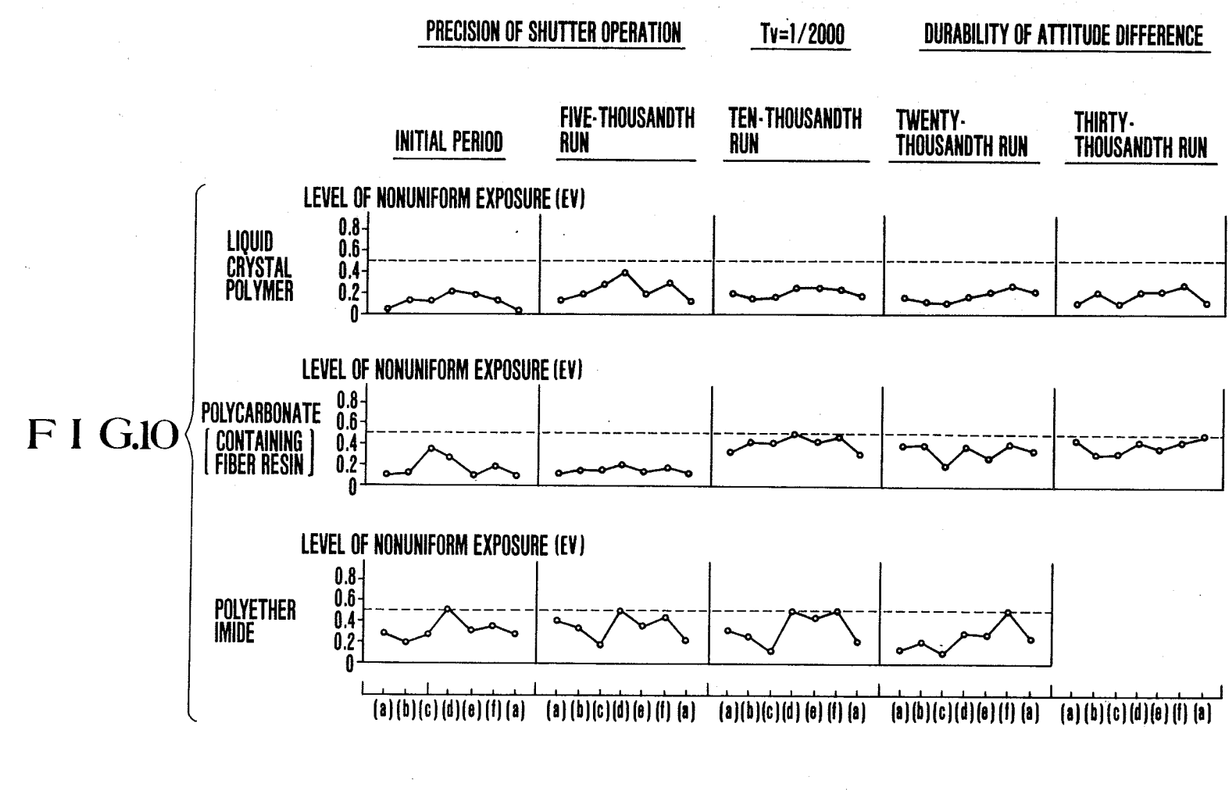
FIG. 10 is a graphic representation of the durability of three kinds of shutter in terms of attitude difference, each of the shutters being formed of a different resin material.

FIG. 10 shows the results of experiments which were performed in order to compare the precision of opening and closing operations of shutters of three kinds which respectively include shutter base plates formed of a liquid crystal polymer resin, a glass fiber-containing polycarbonate resin and a polyether imide resin. In these experiments, each of the shutters was made to run at a shutter speed of 1/2,000 seconds (Tv=1/2,000 sec.), and the exposure value of each shutter when placed in each attitude (a) to (f) was measured to obtain the level of nonuniform exposure. As can be seen from FIG. 10, the liquid crystal polymer resin exhibited the best results of the three.

It is to be noted that, in the future, except the above liquid crystal polymer, it will be possible to utilize resin materials such as polycarbonate, polyamide, polyacetal, polyphenylene oxide, polyethylene terephthalate, polybutylene telephthalate, polysulfone, polyphenylene sulfide, polyarylate, polyether sulfone, polyether imide and polyether ketone.

In the presently preferred embodiment, the rib is integrally formed continuously along at least two peripheral sides of the synthetic resin-molded shutter base plate on the surface thereof on which the shutter blades run. Accordingly, it is possible to achieve the improvement of the flatness of the shutter base plate as well as the prevention of the occurrence of its curvature. In addition, it is possible to provide a camera shutter which can be incorporated into a camera body without the need to increase the size of the camera body itself.

Moreover, in accordance with the presently preferred embodiment, in place of a spacer which is necessary as a separate part in the related art, the thick-walled portion equivalent to the spacer is molded integrally with the shutter base plate. Accordingly, it is possible to reduce the number of manufacturing steps and hence to provide a low-cost shutter for use in a camera.

The invention has been described in detail with particular reference to a certain preferred embodiment and illustrative modifications thereof, but it will be understood that variations and modifications can be effected within the spirit and scope of the invention.

What is claimed is:

1. A shutter for use in a camera, comprising:
   a shutter base plate for pivotally supporting blade groups each constituted by a plurality of blades carried by arms; and
   a thick-walled portion being formed on the surface of said shutter base plate that carries said blade groups;
   said thick-walled portion formed in an area which excludes a pivoting area in which said arms make their pivotal motions and which is adjacent to said pivoting area;
   said shutter base plate and said thick-walled portion being integrally formed of a synthetic resin.

2. A shutter according to claim 1, wherein said shutter base plate further includes shafts for pivotally supporting said arms, said shafts being formed integrally with said shutter base plate.

3. A shutter for use in a camera, comprising:
   a shutter base plate for pivotally supporting a leading blade group constituted by a plurality of blades carried by a first set of leading-blade arms and a trailing blade group constituted by a plurality of blades carried by a second set of trailing-blade arms;
   a thick-walled portion formed on the surface of said shutter base plate that carries said leading and trailing blade groups;
   said thick-walled portion formed in an area which excludes a pivoting area in which one of said first and second sets makes its pivotal motion and which is adjacent to said pivoting area, said one of said first and second sets being disposed nearer to the surface of said shutter base plate than is the other;
   said shutter base plate and said thick-walled portion being integrally formed of a synthetic resin.

4. A shutter according to claim 3, wherein said shutter base plate further includes shafts for pivotally supporting said leading-blade and trailing-blade arms, said shafts being formed integrally with said shutter base plate.

5. A shutter for use in a camera comprising a shutter base plate for pivotally supporting blade groups each constituted by a plurality of blades carried by arms, said shutter base plate including a portion which is adjacent to and thicker than a pivoting area in which said arms make their pivotal motions, said shutter base plate and said thick-walled portion being integrally formed of a synthetic resin.

6. A shutter for use in a camera comprising a shutter base plate for pivotally supporting blade groups each constituted by a plurality of blades carried by arms, the portion of said shutter base plate corresponding to a pivoting area in which said arms make their pivotal motions being made thinner than the portion corresponding to a pivoting area in which said blade groups make their pivotal motions, said shutter base plate being integrally formed of a synthetic resin.

7. A shutter for use in a camera comprising a shutter base plate for pivotally supporting blade groups each constituted by a plurality of blades carried by arms, said shutter base plate including an aperture and shafts for pivotally supporting said arms, said shafts being disposed on one side of said aperture in the lateral direction, the portions of said shutter base plate corresponding to the vertical sides of said aperture being made thicker than the portion corresponding to a pivoting area in which said arms make their pivotal motions, said shutter base plate being integrally formed of a synthetic resin.

8. A shutter for use in a camera comprising a shutter base plate which includes an aperture and which pivotally supports two blade groups each constituted by a plurality of blades carried by arms, said shutter base plate having shafts for pivotally supporting said arms, said shafts being disposed on one side of said aperture in the lateral direction, said shutter base plate being integrally formed of a synthetic resin such that one edge portion thereof which faces above or below said aperture differs in thickness from the opposing edge portion of said shutter base plate so that the amount in which the surface of said shutter base plate protrudes toward said shutter blade groups may be varied.

9. A shutter according to claim 8, wherein one of said edge portions is thicker than the other, a slit forming blade of the one of said two blade groups that is disposed nearer to the surface of said shutter base plate being located adjacent to said thicker one when said blade group nearer to said surface covers said aperture.

10. A shutter according to claim 8, wherein the edge portions of said shutter base plate that face above and below said aperture are thicker than the portion of said shutter base plate that corresponds to a running area for said arms.

11. A shutter for use in a camera comprising a shutter base plate which includes an aperture and which pivotally supports blade groups each constituted by a plurality of blades carried by arms, said aperture having an end surface inclined so as not to be vertical to the plane of said shutter base plate, and integrally formed in an edge-shape to define said aperture.

12. A shutter for use in a camera comprising a shutter base plate which includes an aperture and which pivotally supports blade groups each constituted by a plurality of blades carried by arms, said shutter base plate having an approximately arcuate end surface which is integrally formed to define said aperture.

13. A shutter for use in a camera comprising a shutter base plate for pivotally supporting blade groups each constituted by a plurality of blades carried by arms, said shutter base plate including a rib which is integrally formed on the surface of said shutter base plate that carries said blade groups and along the edge portion on a side which corresponds to the free end portions of said blade groups.

14. A shutter for use in a camera comprising a shutter base plate for pivotally supporting blade groups each constituted by a plurality of blades carried by arms, said shutter base plate including shafts for pivotally supporting said arms, said shutter base plate and said shafts being integrally formed of a liquid crystal polymer resin.

15. A shutter according to claim 14, further comprising blade driving lever shafts which are integrally formed on the reverse side of said shutter base plate with respect to said shafts for pivotally supporting said arms.

16. A shutter according to claim 14, further comprising a rib integrally formed with said shutter base plate and protruding vertically relative to the plane of said shutter base plate.

17. A shutter according to claim 14, further comprising an aperture having an end surface integrally formed with said shutter base plate, said end surface being inclined so as not to be vertical to the plane of said shutter base plate.

18. A shutter according to claim 14, further comprising an aperture having an end surface integrally formed with said shutter base plate, said end surface being formed in an almost circular arc.

19. A shutter for use in a camera comprising a shutter base plate for pivotally supporting blade groups each constituted by a plurality of blades carried by arms, said shutter base plate including shafts for pivotally supporting said arms, said shutter base plate and said shaft being integrally formed of a liquid crystal polymer resin,
   wherein said base plate includes portions each having a different thickness; and
   wherein the portion of said shutter base plate which corresponds to a running area of said arms is thinner than the adjacent portion.

20. A shutter for use in a camera comprising a shutter base plate for pivotally supporting blade groups each constituted by a plurality of blades carried by arms, said shutter base plate including shafts for pivotally supporting said arms, said shutter base plate and said shafts being integrally formed of a liquid crystal polymer resin,
   wherein said base plate includes portions each having a different thickness; and
   wherein said shutter base plate includes a surface having at least two peripheral sides along which ribs are formed.

21. A shutter for use in a camera, comprising:
   a shutter base plate which includes an aperture and which pivotally supports two blade groups each constituted by a plurality of blades carried by arms, said shutter base plate having shafts for pivotally supporting said arms, said shafts being disposed on one side of said aperture in the lateral direction while a thick-walled portion is formed on the other side, said thick-walled portion serving as a spacer by protruding in the direction of thickness of said shutter base plate from the edge portions of said shutter base plate that face above and below said aperture.

* * * * *

UNITED STATES PATENT AND TRADEMARK OFFICE
CERTIFICATE OF CORRECTION

PATENT NO. : 4,926,202
DATED : May 15, 1990
INVENTOR(S) : FUKUDA, ET AL.

It is certified that error appears in the above-identified patent and that said Letters Patent is hereby corrected as shown below:

Title page:
AT [56] References Cited:

"Suzuki et al." should read --Suzuki--.

AT [73] Assignee:

"Assignee:" should read --Assignees:--.

COLUMN 8

Line 43, ""telephthalate," should read --terephthalate--

COLUMN 10

Line 17, "slit forming" should read --slit-forming--.
Line 56, "blade driving lever shafts" should read --blade-driving lever shafts--.

Signed and Sealed this

First Day of September, 1992

Attest:

DOUGLAS B. COMER

Attesting Officer

Acting Commissioner of Patents and Trademarks